United States Patent Office 2,770,395
Patented Nov. 13, 1956

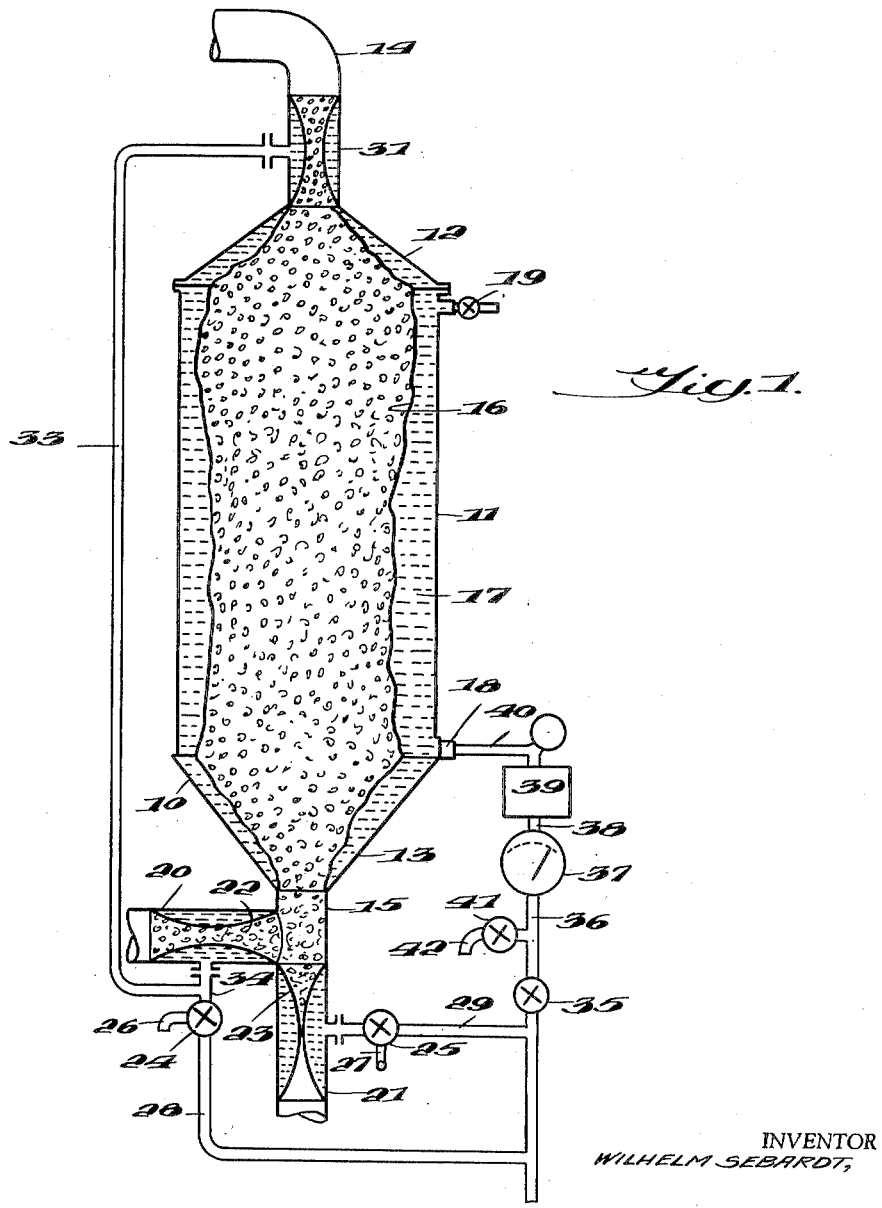

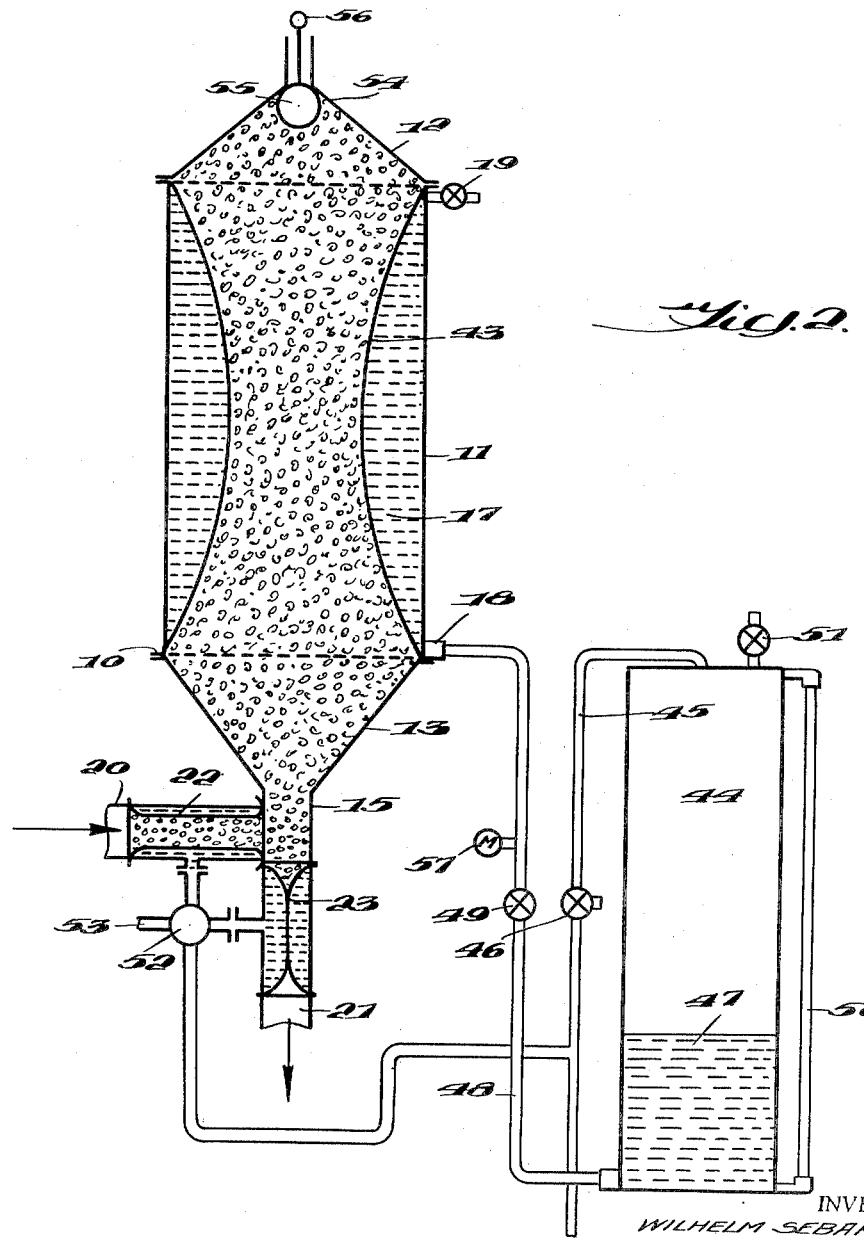

2,770,395
PORTIONING DEVICE FOR VISCOUS MASSES

Wilhelm Sebardt, Bromma, Sweden, assignor to International Ytong-Stabalite Company Ltd., London, England, a corporation of Great Britain Application January 27, 1953, Serial No. 333,593

Claims priority, application Sweden February 7, 1952

5 Claims. (Cl. 222—23)

Devices used hitherto for apportioning viscous substances and/or fluids which carry particles or granular matter have often shown a tendency to deposit the granular matter during the time when the substance was stored in the portioning vessel, and thereby a certain loss of the matter in question was caused. Furthermore the deposits created cause an erroneous measurement in subsequent operations.

In portioning devices, the use of level regulators of the conventional type for determining the desired portion has been customary. These level regulators are, however, not reliable, when slimelike materials with a tendency to deposit the granular matter are to be measured, which materials may especially be deposited in the control means (valves, floats, measuring vessels and so on) or in the surplus outlet. Additionally the measuring vessels usually used when portioning substances with granules are open, so that inspection or cleaning will be possible. Also other disadvantages will arise, for instance by overfilling or splashing of the portioned substance. This may be especially inconvenient, if the fluid medium is evaporable, so that the particles in drying get stuck on floors and walls or other objects on which it may have been splashed.

The present invention refers to a portioning device, handy to use and not impaired by the abovementioned disadvantages. According to the invention the portioning device comprises a vessel which is divided into two parts, one of which being formed in such a way that it can be made to expand to the desired volume, the remaining volume inside the vessel, intended for the portioning action, determining the quantity of the portioned medium which shall be measured in each case. Furthermore, arrangements are made for a sure control of the volume of the expandable chamber, and thereby, indirectly, also the remaining chamber intended for the portioning.

It is suitable to use an outer vessel of known inner volume, provided with an internal lining, bladder or similar means of some easily deformable material, for instance rubber. The part of the interior volume of the vessel, thus formed and limited, will suitably be in connection with a conduit, through which the fluid in controlled quantities may be fed to the expansion chamber. If, therefore, a given known quantity of a fluid is fed to the expansion chamber, then the volume of the expansion chamber will increase correspondingly, and the volume of the remaining chamber will decrease in the same measure. One should therefore use some kind of measuring device for control of the amount of fluid fed to the expansion chamber so that one may simultaneously control the volume of the remaining portioning chamber in an easy way. In this manner one can by suitable means provide a control device for the portioning chamber by means of which the volume of said chamber may be continuously controlled with a high degree of precision from the zero volume to a volume substantially coinciding with the initial volume of the vessel.

Further details of the invention will be evident from the following specification in connection with the attached drawings, in which Figs. 1 and 2 show diagrammatically in vertical section two forms of execution of the invention.

The portioning device shown in the drawings is in the first place intended for portioning of substances, such as are present in connection with the production of artificial stones. Such substances contain as a rule comparatively heavy particles which have, furthermore, a tendency to bind under cementation, both of these circumstances acting so that deposits from the slime of these particles will easily take place. It is therefore important that at each portioning action one prevents as far as possible the deposits from remaining in the portioning device, and, as this cannot be entirely avoided, steps should be taken so that the deposits in any case are following the next portion, measured by means of same portioning device, or are otherwise easily removed from the measuring vessel of the portioning device. These requirements are satisfied by the arrangement according to the invention, such as it is shown in the drawings.

In the arrangement shown in Fig. 1, a vessel 10 is provided with a cylindrical lining-formed sidewall 11, a conical lid 12 and an equally conical bottom 13. To the conical lid part 12 a pipe 14 is attached, and to the conical bottom part is in a corresponding way attached a pipe 15. At the joining place between the bottom part 13 and the pipe 15 as well as between the lid part 12 and the pipe part 14, a tube-formed intermediate wall of some suitable material is provided. Said intermediate part 16 has therefore more or less the form of a sack, open at both ends. It may, for instance, be made of some elastic material, such as rubber, but it may also be made of a flexible material, such as a tight fabric, plastic or the like. In the shown form of execution the expansion room 17 is formed by the interspace between the wall of the vessel and the tube-formed element 16. This expansion room is in connection with a conduit 18 for adding or removing fluid. At the top the expansion room is provided with an air vent device 19.

Immediately below the funnel-shaped bottom part 13 of the vessel 10, the conduit 15 is branched into one feeding branch 20 and one output branch 21. In both these branches valves are inserted, and these valves are especially designed to prevent the accumulation of slime. Thus, they contain a pair of rubber linings 22, 23 or mantles of other suitable material, arranged on the inside and secured to the branch conduits 20 and 21, respectively. Each mantle room between the pipe part 20 and the rubber lining 22 or between the pipe part 21 and the lining 23, respectively, is connected to a valve 24 and 25, respectively, of the three-way type. Another of the inputs of the valve is connected to a pipe 26 or 27, respectively, leading to some suitable storing room for the water used, and the third conduit 28 or 29, respectively, leads to a conduit 30 for water under pressure, for instance an ordinary water conduit. There is further a similar valve containing the pipe socket 31 and the rubber tube 32 inserted therein, and these are by means of the pipe 33 connected to the pipe part 34, running between the valve 24 and the interspace formed between the pipe part 20 and the rubber hose 22.

The water conduit 30 is connected to a further valve 35, a pipe part 36, a meter 37, a pipe part 38 and a filter 39 and finally a pipe part 40, leading to the input opening 18 of the expansion chamber between the outer wall 11 of the vessel 10 and the rubber lining 16 applied in the vessel. From the pipe part 36 a valve 41 is branched, said valve leading to a surplus escape 42, which may suitably be arranged to transfer the overflowing fluid to the same vessel to which the pipes 26 and 27 are also connected. The meter 37 should preferably be of the kind which registers the flowing fluid quantity in both directions. Besides, it can be a fluid meter of conventional commercial type.

It is assumed that by the portioning device shown in Fig. 1, a viscous mass, for instance slurry-like, shall be portioned. This mass is assumed to be kept in a storeroom, from which the mass can be pumped in a continuous stream, flowing through the pipe 20, the tube 16 and the pipe 14 and back to the storeroom.

The arrangement is used in the following manner: First the tap 19 is opened and the tap 25 is put into such a position that water is pressed into the space between the pipe 21 and the rubber lining 23, so that the valve formed by these parts is closed. Further the three-way valve 24 is put into such a position, that the amount of fluid present in the space between the pipe 20 and the rubber lining 22 is allowed to flow away so that the valve formed between these parts is opened, and the substance is allowed to enter the vessel 10. Owing to the connection 33 the valve formed by the pipe part 31 and the rubber tube 32 is also simultaneously opened. Provided, as mentioned above, that the medium is pumped in circulation from the container where it is stored, the medium will now immediately enter the vessel 10 through the valve 20—22 and as far as possible completely fill that vessel, whereby an eventual surplus will be pressed out through the pipe 14 and be brought back to the storing vessel. The substance, circulating in this way through the portioning device will then press the lining 16 onto the inner side of the outer walls of the vesesl 10. The fluid which may have been present in the interspace between the outer walls and the rubber lining 16, the so called expansion chamber, will then flow out through pipe 19.

After this the valve 35 is opened for letting through water to the chamber that may possibly still exist between the outer walls of vessel 10 and the rubber lining 16 as well as to the parts connected thereto, and this rather small chamber will rapidly be filled which can be observed thereby that the water is flowing out through the air vent valve 19. At this moment the valve 35 is first closed, and immediately thereafter also the valve 19. The counting work of the meter 37 is now set to zero for indicating that the vessel contains maximum volume of the portioned medium and minimum volume of water in the expansion part 17 of the vessel 10. The zero setting does not necessarily mean that the pointer or the counting work of the meter is really brought to give zero indication, but it may, instead, be advantageous to set the counting work on a figure value, indicating the maximum volume in the portioning vessel.

The arrangement is hereafter ready for use. If thereby a smaller volume of the portioned medium than the maximum is desired, then one has only to open the valve 35 to let in water in the interspace between the outer walls of the vessel 10 and the lining 16, the corresponding quantity of the substance simultaneously being pressed out through the conduit 14 back to the storing room. The meter 37 will then move in such a direction that it indicates the water volume thus fed, and if one has graduated the dial or counting work of the meter according to maximum volume in the portioning room, then the counter will move backwards, until it indicates the volume remaining in the portioning chamber after the expansion movement of the expansion chamber. When the desired volume has been obtained, the valve 35 is closed.

When the quantity thus present in the portioning device is to be taken away, the valves 20—22 and 31—32 are first closed by setting the valve 24 in such a way that water from the pressure conduit 30 is transferred to the intermediate space between the pipe parts 20 and 31, on the one side, and the rubber tubes 22 and 32, respectively, on the other side. The rubber tubes are then pressed together, so that the circulating substance can no longer pass through the valves formed in this way. Thereafter the valve 21—23 is opened for tapping the measured quantity of the substance. This takes place in such a way, that the valve 25 is put into such a position that the quantity of fluid present between the pipe part 21 and the rubber tube 23 is under pressure given a possibility to flow off through the conduit 27. If desired, one may even connect the conduits 26 and 27 with some place under sub-pressure, so that the valves will thereby open more quickly. The pipe part 21 should thereby be so wide that necessary air may enter into the portioning device in order to replace the outflow of the mass, and so that consequently no sub-pressure will be formed in the portioning device.

When a measured quantity of the mass has in this way been portioned out through the pipes 15 and 21, the device is ready to be used anew. If thereby the same quantity of the substance in question is to be measured, no resetting is necessary. If, on the other hand, a smaller quantity is to be measured, the valve 35 must be opened anew, until an amount of water corresponding to the decrease in volume has entered the lining chamber 17. If, however, the measured quantity should be greater, then the valve 41 is instead opened, so that an amount of water corresponding to increase in volume may flow off from the mantle chamber 17 through pipe 40, the filter 39, the pipe part 38, the meter 37, the pipe part 36, the valve 41 and the pipe part 42. With the valves 35 and 41 closed, the valves 24 and 25 are again reset, so that the valves 20—22 and 31—32 are opened, whereas the valve 21—23 is closed. Immediately, the mass then starts again to circulate through the portioning device, but in the first moment there will still be an air cushion present, replacing the portion of the substance just fed out. This air cushion is pushed in front of the mass and is removed through pipe 14, where it escapes through the storing container for the mass.

The portioning device having again been filled in this way, it may be emptied anew in the way described above.

The object of the filter 39 is to protect the meter 37 from damages, if the membrane 16 should give way, so that the measured substance enters into and is mixed with the water used for setting the quantity. The filter 39 is suitably provided with an inspection glass.

In the arrangement according to Fig. 2, parts common for both devices have the same reference numerals. The devices differ, however, in the following respects: In the arrangement according to Fig. 2, the substance subject to the portioning action is not circulated through the portioning device, as it has a decreased tendency to deposit, and consequently the arrangement may be simplified. Further, no sack 16 is arranged in the manner shown in Fig. 1, but instead a tube formed membrane 43 has been put in along the edges of the wall part 11 of the portioning chamber 10, for instance a membrane of rubber, mainly in the same way as the membranes 22, 23 and 32 were put in the arrangement shown in Fig. 1. Finally, for the setting of the volume of the expansion chamber pressure water from a water conduit is not used in the arrangement according to Fig. 2, said pressure water being controlled by means of a current meter instrument, the quantity being measured directly by means of a measuring vessel, hereinafter named the secondary vessel. For controlling the volume of the portioning chamber in this case a secondary vessel 44 is used. This is by means of a pipe conduit 45 with a valve 46 connected to a source of pressure medium, for instance air pressure. Furthermore, in the part below the air pressure level the vessel contains a medium 47, preferably a fluid such as oil, water or the like which through a pipe conduit 48 with a valve 49 communicates with the spacing 17 between the outer wall 11 and the rubber lining 43 in the vessel 10.

The secondary vessel 44 is provided with a water level gauge 50 for indicating the liquid level present therein, as well as a fluid inlet valve 51 which may also be used as an air vent valve. Normally, however, the valve 46 is used as an air vent valve, said valve being made as a three-way valve and the third branch being connected to the atmosphere.

The spacings in the valves 20—22 and 21—23, respectively, are connected to a four-way valve 52 which at least indirectly is in connection with the source of pressure medium, for instance pressure air. The four-way valve is so constructed, that it connects the spacing between the pipe part 21 and the lining 23 with the pressure medium simultaneously as the corresponding spacing between the pipe part 20 and the limining 22 is connected with the atmosphere or an evacuating conduit 53, thereafter it connects the last mentioned spacing with the medium, and finally it connects the first mentioned spacing with the atmosphere or with the evacuating conduit 53.

Preferably the portioning vessel may in its upper part be provided with an air vent opening 54, arranged to be closed by means of a float valve 55, when the vessel is filled with the substance to be portioned. The float valve, which is suitably made of rubber, may be provided with an indicator 56 visible outside the vessel for indicating a signal as a sign that the vessel is full, but it is also possible to indicate this in another way. So for instance, the sudden pressure increase, arising at the closing of the float valve, may be read on a manometer 57 connected into the conduit 48.

In use the device functions in the following way: The valve 49 having been opened, the upper part of the secondary vessel 44 is by means of the three-way valve 46 connected over the conduit 45 to the source of air pressure, whereby the fluid level in the vessel is pressed downwards. Thereby the amount of fluid pressed out from the vessel 44 is transferred to the spacing 17 between the lining 43 and the inner wall 11 of the portioning vessel 10. The lining 43 is thereby successively curved inwards, so that the effective room in the portioning chamber is decreased the same amount as the quantity of fluid pressed down from the secondary vessel 44. The quantity of this fluid, and also the remaining volume in the portioning vessel, can be read by means of the fluid level gauge 50, which is suitably directly graduated according to the remaining volume of the portioning vessel. The correct volume thus having been set in the portioning vessel, the valves 46 and 49 are closed, and thereafter the volume of the portioning vessel is no longer changed. Thereafter the valve 52 is set in the position shown in the drawing, in which the portioning vessel is connected to the feeding conduit 20. Irrespective of whether the substance to be portioned is permanently under suitable pressure, or a pressure is temporarily created by the starting of a pump, the portioned substance will now be pressed from below into the portioning vessel. The filling of the vessel will thus continue until the float valve 55, which is floating on the surface of the substance, closes the upper opening 54 and thereby prevents a further supply.

The portioning vessel is now filled with a measured amount of the substance. The valve 52 is then reset in such a way that the membrane 22 closes the feeding conduit 20. The measured quantity of the substance may now, either immediately or at a suitable later occasion, be fed out by resetting the valve 52 into the position where the rubber membrane 23 is no longer tightly compressed. At the feeding out of the substance, the float valve 55 will immediately move downwards, air thereby being let in. Thereby a rapid current is created.

If the same quantity of the substance is to be measured at a subsequent use of the device, then no resetting of the water level in the vessel 44 will be necessary, but if another quantity is to be measured, then one will have to connect the interior of the vessel 44 over the valve 46 either with the atmosphere, so that part of the air present in the vessel will be let out, or with the air pressure conduit, so that more air is pressed into the vessel. At this operation the valve 49 should, of course, be open.

If, for instance, the medium to be portioned, consists of a slurry of constituents, used in the production of artificial stones, that is, for instance, cement and finely ground quartz, sand, or other mineral substance, or of slate ashes together with lime or the like, then experience has shown that most of these stuffs have a tendency to form deposits. It being further in the nature of this matter, that the materials have to be cemented, in order that an artificial stone shall be formed, it is easily understood that the materials in question will initially be deposited in the lower part and on the walls of the portioning vessel.

As the filling as well as the emptying of the portioning vessel takes place at its lower part, the deposits occurring there will be very effectively washed away. The deposits which may have been formed on the walls of the portioning vessel will adhere to the flexible, preferably elastic material in the lining, the form of which will be changed during the time of emptying the portioning vessel. Thus, the lining will immediately before emptying the vessel have substantially the form shown in the drawing, but the moment the level of the substance sinks, the counter-pressure from the substance stops, whereby first the upper part of the lining momentarily will be curved inwards, whereas the lower part of the lining will move in the direction onto the wall 10, so that thereafter, after the portioning vessel has been completely emptied, the upper part will instead move onto the outer wall 10, whereas the lower part of the fluid medium present in the spacing will assume a curved form. By these movements of the lining, deposits which may be present will be very effectively broken away and they will again be washed up in the substance. The change of form of the lining takes place, each time a resetting of the effective volume is made.

The valves for input and output of the substance, to and from the portioning vessel, being constructed in the manner shown in the drawing, also prevents deposits by the movements of the rubber linings in the valves under the influence of the resetting pressure.

The portioning device according to the present invention is, however, not limited to the use in connection with portioning of such substances which have a tendency to deposit, but it may advantageously be used for all kinds of gases, liquid or semi-liquid stuffs, but also for dry, finely divided substances, especially for such with a tendency to flow. Under all circumstances it gives the advantage of a simple setting of the volume and easy operation, and this can furthermore take place at a long distance from the portioning vessel.

The invention is, of course, not limited to the two forms of execution described above and shown in the drawings, but different modifications may be made within the scope of the invention. Thus, for instance, the side walls of the portioning chamber have in both these forms of execution been shown as made of a flexible material, and according to Fig. 2 the portioning chamber is as a whole surrounded by such material. The portioning vessel may further be constructed in such a way that the measured substance is quite surrounded by stiff outer walls, whereas the variation of volume takes place by means of a bladder, bellows or the like, which is submerged in the container and which can be filled with a fluid.

Nor must the arrangement necessarily, as shown in the two forms of execution, have the character of a closed vessel with the inlet as well as the outlet in its lower part. The portioning vessel can instead be arranged to work as a percolation vessel, preferably completely closed, or if desired, with the upper part wholly or partly open.

What I claim is:

1. In a device for measuring predetermined volumes of viscous substances comprising, a vessel, a lining disposed within said vessel, the lining being of an easily deformable material and forming two chambers within said vessel, an outer expansion chamber between the lining and the walls of the vessel and an inner portioning chamber within the lining, means including a meter connected to the expansion chamber for admitting a predetermined volume of fluid to the expansion chamber whereby the volume of the portioning chamber is established at a predetermined value, means for filling the portioning chamber with the viscous substance to be measured, and means independent of said last-named means for drawing off the measured volume of the viscous substance.

2. A device as recited in claim 1 wherein said means connected to the expansion chamber includes a protection filter and a fluid meter.

3. A device as recited in claim 1 wherein the portioning chamber is provided with openings at the upper and lower ends thereof.

4. In a device for measuring predetermined volumes of viscous substances comprising a vessel having a funnel-shaped lower end, openings in the lower and upper ends of said vessel, a lining disposed within said vessel and having openings therein in alignment with the openings in said vessel and forming in said vessel an inner portioning chamber and an outer expansion chamber, means connecting the expansion chamber with a source of fluid, said means including a filter and a fluid meter, a conduit connecting the funnel-shaped end of said vessel with a source of viscous substance, and valve means to open and close the opening in the lower end of said vessel to draw off a volume of the viscous substance determined by the volume of fluid in said expansion chamber.

5. A device as recited in claim 4 wherein the lining is formed of a flexible elastic material.

References Cited in the file of this patent

UNITED STATES PATENTS

| | | |
|---|---|---|
| 876,968 | James | Jan. 21, 1908 |
| 1,465,620 | Anderson | Aug. 21, 1923 |
| 2,381,304 | Merrill | Aug. 7, 1945 |
| 2,505,798 | Skinner | May 2, 1950 |
| 2,621,719 | Eaton et al. | Dec. 16, 1952 |
| 2,659,516 | Smith | Nov. 17, 1953 |
| 2,692,707 | Maxwell | Oct. 26, 1954 |